Jan. 4, 1944.     G. W. EMRICK     2,338,626
TOOL CHUCK
Filed Nov. 20, 1942
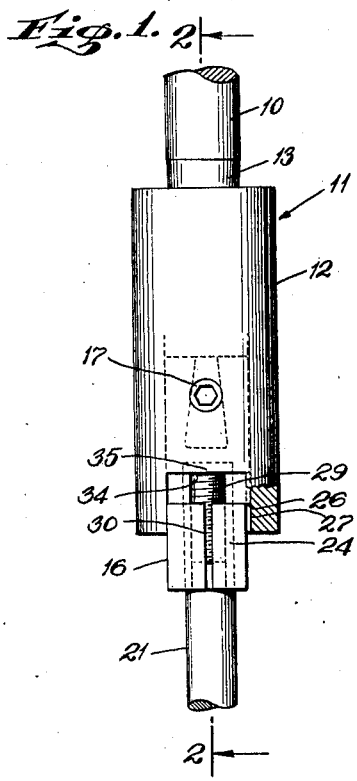
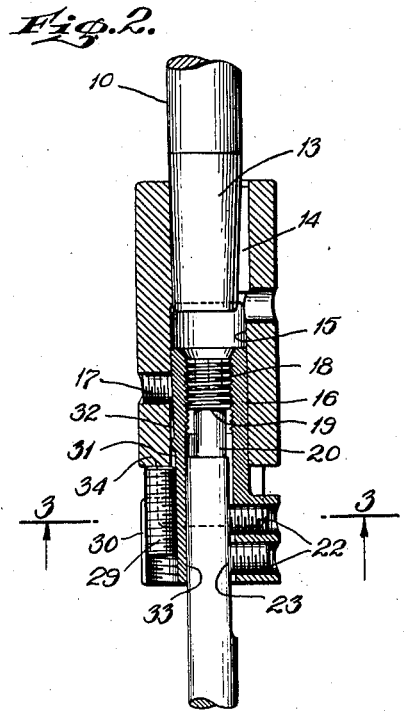
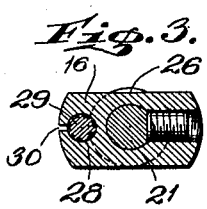
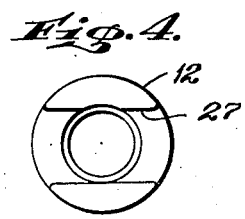
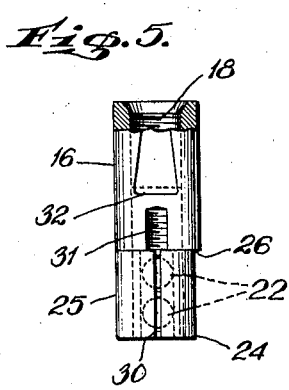
INVENTOR
GEORGE W. EMRICK
BY
*Howard E. Thompson*
ATTORNEY Patented Jan. 4, 1944

2,338,626

UNITED STATES PATENT OFFICE 2,338,626

TOOL CHUCK

George W. Emrick, Brooklyn, N. Y.

Application November 20, 1942, Serial No. 466,529

12 Claims. (Cl. 279—33)

This invention relates to chuck devices for use in supporting tools, such for example, as drills, taps and the like. More particularly, the invention relates to devices of this type and kind which will facilitate the quick attachment and detachment of tools in drilling and tapping machines, and more particularly in machines of this kind employing what are known as multiple heads and further to provision of a chuck device having means for adjustably supporting the tool to accurately position the tool in the control of the depth of cut in a workpiece.

The novel features of the invention will be best understood from the following description when taken together with the accompanying drawing, in which certain embodiments of the invention are disclosed, and in which the separate parts are designated by suitable reference characters in each of the views; and in which:

Fig. 1 is a face view of a chuck device made according to my invention.

Fig. 2 is a longitudinal section on the line 2—2 of Fig. 1.

Fig. 3 is a cross section on the line 3—3 of Fig. 2, and showing only a part of the construction.

Fig. 4 is an end view of the chuck sleeve looking in the direction of the arrow 4 of Fig. 2, and Fig. 5 is a view looking in the direction of the arrow 5 of Fig. 3 with part of the construction shown in section.

In mounting drills, taps, and similar tools in various machines or in connection with what is termed multiple heads of such machines, it has been customary to employ suitable chuck devices. Difficulty has been experienced in many mountings of tools of this type and kind from the standpoint of close relationship of the tools with respect to each other in what are termed multiple heads, and further in properly setting the tool, particularly in controlling the depth of cut in a workpiece.

It is the purpose of my invention to provide a tool supporting chuck having means providing quick attachment and detachement of the tool while maintaining predetermined adjustments of the tool. Further in providing a chuck which will provide close arrangement of a plurality of tools. For example, in a multiple head, and in rendering the chucks accessible for attachment and detachment of the tool.

In accomplishing the foregoing I employ a chuck sleeve attachable to the spindle of the machine or machine attachment together with an adaptor member with means in the member adjustably supporting a tool therein. The member having a stop screw adjustably positioning the member in said sleeve.

In the accompanying drawing is shown one adaptation of the invention. In Fig. 1 of the drawing, 10 represents a spindle in connection with which a chuck device 11 is adapted to be mounted. The chuck device comprises a sleeve 12 having at its upper end a tapered bore 13 fitting the tapered end of the spindle 10, and also preferably provided with a key way 14 for receiving a key on said spindle. In the lower portion of the sleeve 12 is a bore 15 in which a tool supporting member 16 is adapted to be adjustably supported and held in different positions of adjustments by a set screw 17.

The member 16 is tubular in form and has at its upper end an internally threaded portion 18 in which is adjustably mounted a stop plug 19, the lower reduced end 20 of which is adapted to engage the upper end of a tool 21, such for example, as a tap, drill, or the like. The plug stop 19 is employed to determine an approximate setting of the tool in controlling the depth of cut thereof, and the tool 21 is held in the bore of the member 16 by one or two set screws 22, two being shown in the present construction, which engage a flattened surface 23 at one side of the upper end portion of the tool 21.

The screws 22 are mounted in a lower enlarged portion 24 on the member 16, and this enlarged portion is offset so that one surface 25 thereof is flush with one side of the upper tubular end of the member 16, whereas the other surface projects to form a shoulder 26, note Fig. 5. The purpose of this offcentering of the enlargement 24 is to provide a one way mounting only of the member 16 in the clutch sleeve 12.

The lower portion of the sleeve 12 is provided with a transverse slot or groove 27, note Fig. 4, which is also formed offset with respect to the axis of the sleeve 12 to accommodate the enlarged or head portion 24 of the member 16. As will appear in Fig. 1, this head portion 24 is free to slide in the aperture or slot 27 in the adjustment of the tool 21 with respect to the sleeve 12.

At the opposite side of the head 24 is formed a vertical threaded aperture 28 in which is adjustably supported a stop screw 29. The outer wall of the head 12 is split, as seen at 30, the split opening into the threaded bore 28, so as to slightly compress the wall portions to effect a tight fitting of the stop screw 29 therein, thereby frictionally maintaining any adjusted position thereof.

One side of the tubular portion of the member 16 is flattened or cut away, as seen at 31 and 32, the flattened portion 31 providing clearance of the screw 29, whereas the flattened portion 32 is adapted to be engaged by the set screw 17. At this time, it is pointed out that all of the screws 17, 22, and 29 as well as the stop plug 19 are of the "Allen" socket type to receive the standardized "Allen" wrench. It will be understood that other types of constructions may be employed however.

In actual practice, the chuck sleeve 12 will be made in several sizes to accommodate certain ranges of tools, and within each size the adaptors will be standardized to fit the sleeve, but one adaptor member may have a bore 33 drilled for one size of tool shank and another adaptor a different bore size to receive another tool, and yet these different sized tools arranged in the standardized adaptors will fit the one size sleeve.

In mounting the tool, such as 21, in the member 16, the stop plug 19 is first adjusted to give an approximately accurate location of the tool in said member, after which the set screws 22 are tightened to retain the tool against displacement from said member. With known dimensions of a sleeve the stop screw 29 may be adjusted to position the end 34 thereof, a predetermined distance from the lower end of the tool, this adjustment being made to suit the depth of cut to be formed in the workpiece by the tool.

When this adjustment is accurately made and carefully gaged, the tool including the adaptor member 19 is mounted in the chuck sleeve 12, and the set screw 17 is tightened to retain the member and tool in position. In the above operation, the end 34 of the stop screw seats upon the surface of the cut or apertured portion of the sleeve 12 as clearly seen at 35 in Fig. 1 of the drawing.

From the foregoing, it will be apparent that when a tool becomes dull and requires replacement, another tool properly mounted in a member 16 may be replaced for the worn tool by simply loosening the screw 17, removing the old tool and its member 16, and inserting the new combination. It will thus be seen that several of the members 16 may be used in conjunction with a single sleeve, and in this way no time is lost from the standpoint of changing tools.

In some instances, the tool 21 may be adjusted while the member 16 is arranged within the sleeve 12. This can be done by simply loosening the screw 17, and then adjusting the screw 29 to the desired stop position after which the screw 17 will be again tightened. In other instances there may be occasions when the tool alone is detached and this can be done by simply loosening one or two of the said screws 22 employed. However, in using tools which have been resharpened and particularly where extreme accuracy is required, it is preferred that the tool plus the adaptor member be removed and replaced, as a close reading or measurement can be accurately computed on the substituted tool, and the time taken for this preparatory for quick insertion in the machine.

It will be understood that the entire chuck body is maintained within the diameter of the sleeve of the chuck employed and where the tools are small and arranged in close proximity to each other, for example, in a multiple head such as disclosed in my prior Patent 1,993,275 of April 16, 1935, these chuck sleeves will be made the smallest possible diameter.

It will also be understood that where a large number of tools are supported in a multiple head the chucks are disposed in close proximity to each other and with my improved construction these chucks become readily accessible for the insertion of the tools necessary for coupling and uncoupling the adaptor members 16.

In other words, the sleeves 12 may be rotated to bring the set screw 17 into a position which will be readily accessible to the operator for insertion of the "Allen" wrench.

Having fully described my invention, what I claim as new and desire to secure by Letters Patent is:

1. A tool supporting chuck comprising two parts, one part having means for attachment to a spindle, the other part slidably engaging the first part in adjusting relative positions of said parts, means retaining said parts in different positions of adjustment, means adjustable in the second part and engaging the first part for adjusting relative position of said parts when the first named retaining means is released, and means adjustably retaining a tool against movement in the second part.

2. A tool supporting chuck comprising two parts, one part having means for attachment to a spindle, the other part slidably engaging the first part in adjusting relative positions of said parts, means retaining said parts in different positions of adjustment, means adjustable in the second part and engaging the first part for adjusting relative position of said parts when the first named retaining means is released, means adjustably retaining a tool against movement in the second part, said last named means comprising an adjustable stop limiting inward movement of the tool in the second named part, and means engaging the tool to retain the same against displacement from said part.

3. A tool supporting chuck comprising two parts, one part having means for attachment to a spindle, the other part slidably engaging the first part in adjusting relative positions of said parts, means retaining said parts in different positions of adjustment, means adjustable in the second part and engaging the first part for adjusting relative position of said parts when the first named retaining means is released, means adjustably retaining a tool against movement in the second part, means keying said parts against rotation, and said last named means comprising an enlarged head on the second named part engaging a slotted portion of the first named part.

4. A tool supporting chuck comprising two parts, one part having means for attachment to a spindle, the other part slidably engaging the first part, means retaining said parts in different positions of adjustment, means adjustable in the second part and engaging the first part for adjusting relative position of said parts, means adjustably supporting a tool in the second part, means keying said parts against rotation, said last named means comprising an enlarged head on the second named part engaging a slotted portion of the first named part, and said head and slot being offset on said parts to provide one way mounting only of the parts in connection with each other.

5. A tool supporting chuck comprising an elongated chuck sleeve, a tool supporting member slidably engaging said sleeve, said sleeve and member having cooperating means keying the same together in sliding movement of the member in the sleeve within predetermined limits, means at one side of the sleeve engaging a corresponding side of the member for retaining the member against movement in the sleeve, and the same side of said member having a stop adjustable therein and engaging said sleeve to gage inward movement of said member in the sleeve.

6. A tool supporting chuck comprising an elongated chuck sleeve, a tool supporting member slidably engaging said sleeve, said sleeve and member having cooperating means keying the same together in sliding movement of the member in the sleeve within predetermined limits, means at one side of the sleeve engaging a corresponding side of the member for retaining the member against movement in the sleeve, the same side of said member having a stop adjustable therein and engaging said sleeve to gage inward movement of said member in the sleeve, said member having a tool receiving bore, and means adjustable in the bore gaging the depth of the mounting of the tool in said member.

7. A tool supporting chuck comprising an elongated chuck sleeve, a tool supporting member slidably engaging said sleeve, said sleeve and member having cooperating means keying the same together in sliding movement of the member in the sleeve within predetermined limits, means at one side of the sleeve engaging a corresponding side of the member for retaining the member against movement in the sleeve, the same side of said member having a stop adjustable therein and engaging said sleeve to gage inward movement of said member in the sleeve, said member having a tool receiving bore, means adjustable in the bore gaging the depth of the mounting of the tool in said member, and means securing the tool against displacement from said member.

8. A chuck of the class described, comprising a sleeve of common outside diameter, one end of the sleeve being slotted to form a transverse key way, a tool supporting member slidably engaging the sleeve and having an integral cross head fitting in the key way of said sleeve to key the member and sleeve against relative rotation, the outside diameter of said cross head conforming with and being arranged within the outside diameter of said sleeve, means in said crosshead adjustably supporting a tool in said member, and means adjustably securing the member in said sleeve.

9. In chuck devices of the class described, the combination with a chuck sleeve, of a tool adaptor member, said member having a tool receiving bore, means adjustable in the bore for gaging the position of the tool in said bore, one end of said member having an enlarged head, means in said head engaging a tool supported in said bore to retain the tool against displacement, said head having a split internally threaded tubular portion arranged longitudinally of said member, and a stop screw adjustable in said split tubular portion.

10. In chucks of the class described, a tool mounting member comprising an elongated tubular body in which a tool is adapted to be arranged, means adjustable longitudinally of the body to gage the positioning of a tool therein, one end of the body having an enlarged head, means in said head for retaining a tool against displacement from said member, and a stop screw adjustably supported in said head to gage mounting of said member in a suitable support.

11. In chucks of the class described, a tool mounting member comprising an elongated tubular body in which a tool is adapted to be arranged, means adjustable longitudinally of the body to gage the positioning of a tool therein, one end of the body having an enlarged head, means in said head for retaining a tool against displacement from said member, a stop screw adjustably supported in said head to gage mounting of said member in a suitable support, one side surface of said head being substantially flush with the outer surface of said tubular body, and the other side surface of the head projecting beyond the surface of said tubular body to form a shoulder.

12. A chuck of the class described, comprising a sleeve of common outside diameter, one end of the sleeve being slotted to form a transverse key way, a tool supporting member slidably engaging the sleeve and having an integral crosshead fitting in the key way of said sleeve to key the member and sleeve against relative rotation, the outside diameter of said crosshead conforming with and being arranged within the outside diameter of said sleeve, means in said crosshead adjustably supporting a tool in said member, means adjustable in the crosshead and cooperating with said sleeve to adjust relative positions of the sleeve and member, and means retaining the member in different positions of adjustment in said sleeve.

GEORGE W. EMRICK.